INVENTORS
FRANK M. CHAPMAN
HARRY S. CHAPMAN
ATTORNEYS

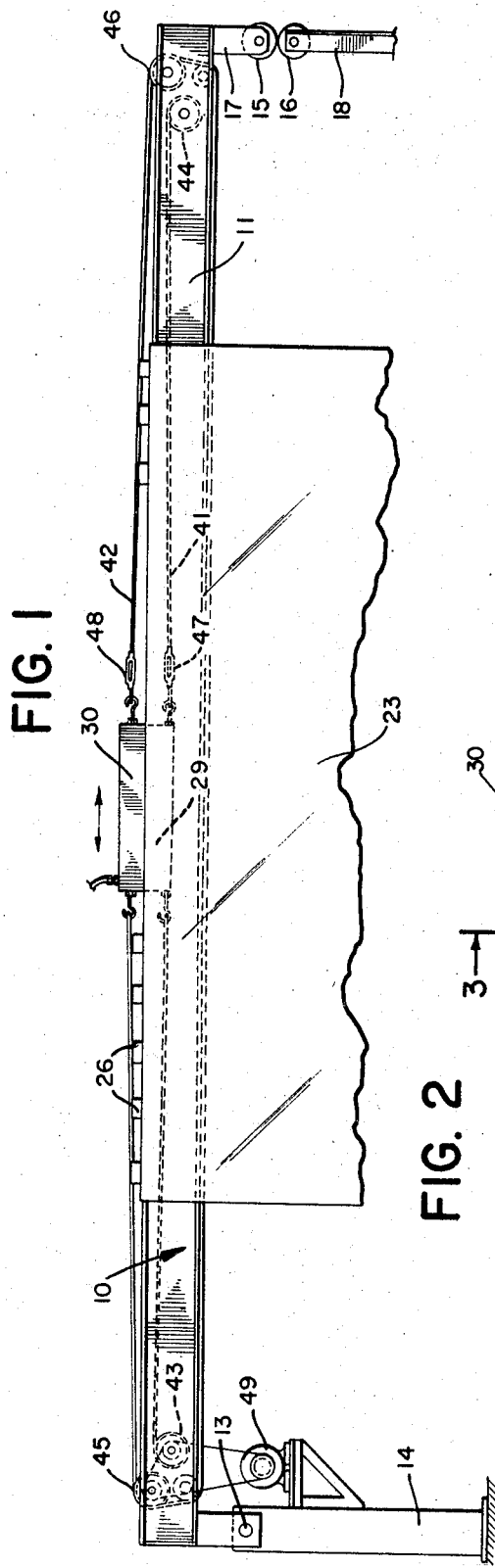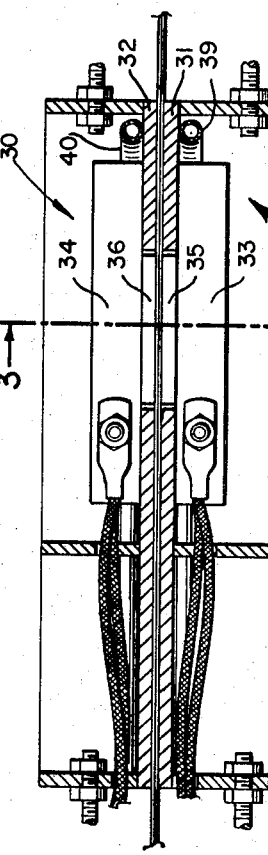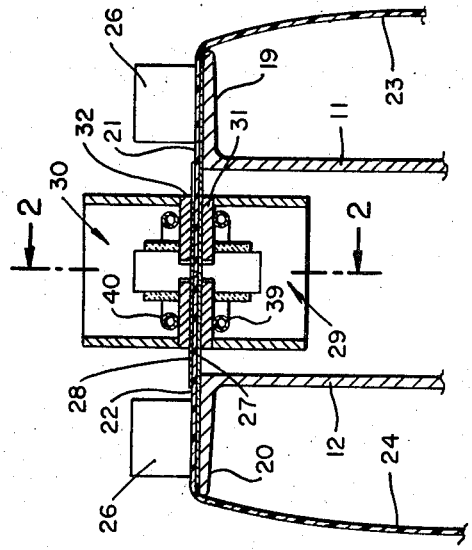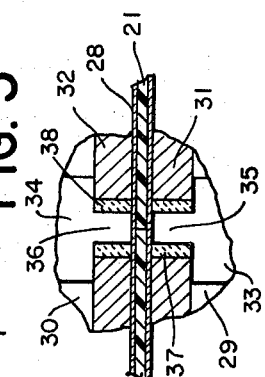
INVENTORS
FRANK M. CHAPMAN
HARRY S. CHAPMAN

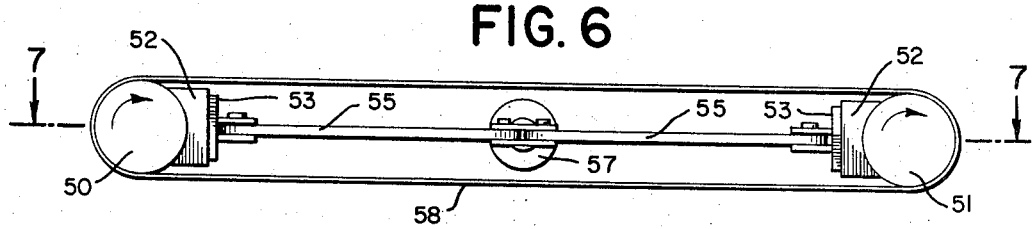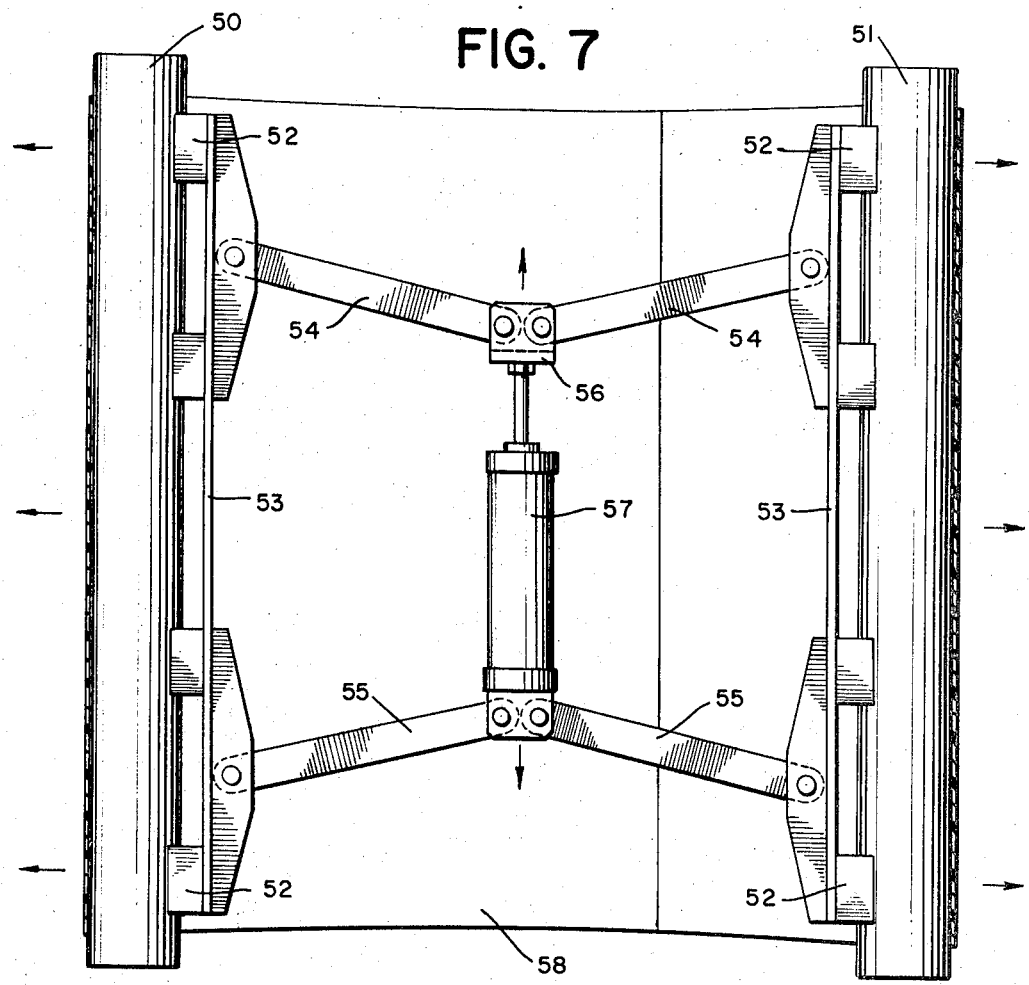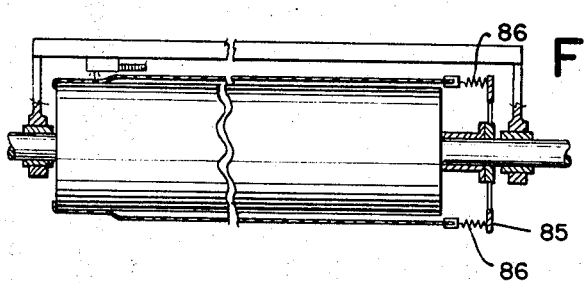

United States Patent Office 3,426,118
Patented Feb. 4, 1969

3,426,118
METHOD FOR COVERING LARGE ROLLS AND THE LIKE WITH FILMS
Frank M. Chapman and Harry S. Chapman, Milan, Mich., assignors to Fluorodynamics, Inc., Wilmington, Del., a corporation of Delaware
Filed Nov. 17, 1964, Ser. No. 411,898
U.S. Cl. 264—230      10 Claims
Int. Cl. B29c 27/20, 27/02

ABSTRACT OF THE DISCLOSURE

The invention is directed to the covering of large rollers with heat-shrinkable films, such as of fluorinated ethylene polymer resins. An important aspect of the invention concerns a novel method of joining heat-sealable films along a seam of great length, utilizing a moving heat source, which is physically separated from the seam by a nonmovable slip sheet. The slip sheet serves to effect precise alignment of the edges of the butted films and isolates the film from effects of movement in the heat source. Other aspects of the invention are directed to procedures to rendering the material heat-shrinkable and procedures for applying the heat-shrinkable material as a covering material for rollers.

---

The advantages of providing rolls and similar elements with coverings of fluorocarbon materials, such as Du Pont's Teflon FEP fluorinated ethylene polymer film, have been widely recognized. However, the difficulties involved in the actual application of such materials to the surfaces of many rolls particularly in the larger sizes, has limited the widespread utilization of this material, even in applications where its desirability seems readily apparent. The present invention, as its primary objective, provides a novel and wholly practical technique for forming very large diameter tubes of fluorinated ethylene polymer materials, with the necessary precision and uniformity, either directly on the roll to be covered or, where appropriate, separately thereof.

Heretofore, roll coverings formed of fluorinated ethylene polymer materials, such as Du Pont's Teflon FEP, have been prepared primarily by one of two processes, neither of which is practical or suitable for the covering of very large rolls. In accordance with one of the known procedures, the film material is initially extruded in the form of a tube, distended to increase its diameter, applied over the roll to be covered, and then heat-shrunk into tight fitting relation to the roll. This technique is prefectly satisfactory for small rolls, but the impracticability of its application to very large rolls may readily be appreciated upon consideration of the difficulty of handling such rolls (for example, dryer drums of a paper or textile machine) and the corresponding difficulties of initially extruding the material in the form of a tube of sufficiently large diameter.

Another technique frequently recommended involves the wrapping of a metal roll with a convolute winding, consisting of a number of layers of fluorocarbon film. The entire winding is then overwrapped, and the wrapped roll is "baked" to fuse the several layers of film into a unified covering layer. This covering layer is then made smooth and cylindrical by a lathe operation. The practical difficulties in carrying out the second described procedure with very large rolls also may be readily appreciated.

In accordance with specific aspects of the present invention, large diameter, elongated tubes of fluorinated ethylene polymer and other heat-sealable materials are prepared, either in situ on the roll to be covered, or where appropriate, at a separate location for subsequent endwise application over the roll, by preparing a predetermined length of the film and joining the opposite ends thereof in a manner to form a heat-sealed butt seam extending from one end of the tube to the other. In this connection, perhaps the most significant concept of the invention resides in the provision of novel and effective techniques for making the heat-sealed butt seam of elongated dimensions in a manner which avoids wrinkling, buckling, and otherwise distorting the film such that, in the finished, covered roll, the seam area is not significantly less smooth or uniform than other areas of the roll covering.

As a specific aspect of the invention, a novel procedure is provided for forming a heat-sealed butt joint or seam in a film of fluorinated ethylene polymer or other heat-sealable material to form a tube thereof, which comprises positioning the opposite end edges of a predetermined length of the film in opposed, aligned, substantially butted relation and joining the substantially butted edges by means of a small area heat source which travels from one end to the other of the seam, to progressively form a heat-sealed butt seam. The dimensions of the heat source are very small in relation to the length of the seam, and cooling means advantageously are provided in generally surrounding relation to the heat source so that only a minimum area of the film material is heated to the fusion point at any given instant during the heat-sealing process. This is particularly significant by way of avoiding distortion of the film in the seam area, which could render the finished article unsuitable or at least less desirable for use as a roll covering. The procedures referred to herein, which will be described in greater detail, although directed particularly to the manufacture of roll coverings of fluorinated ethylene polymer materials, such as Du Pont's Teflon FEP, are potentially useful in connection with the joining of other heat-sealable materials and also in connection with the joining of materials otherwise than for roll coverings, as will be made apparent.

In accordance with another specific aspect of the invention, a procedure is provided for making of a tightly applied, heat-shrunk roll covering in situ, by first preparing a length of fluorinated ethylene polymer or similar heat-sealable film material and distending the film lengthwise throughout most of its length but specifically excluding predetermined edge areas at each end. The film is then applied around the installed roll to be covered, gripped by its non-distended end edge areas, and joined in a heat-sealed butt seam pursuant to procedure previously referred to. Thereafter, heat is applied to the film to shrink the distended regions thereof back toward their initial dimensions, to bring the covering into tight fitting relation to the roll surface.

Another specific aspect of the invention resides in the provision of an improved procedure for the heat-shrinking of a distended tube of heat-shrinkable film material onto a large diameter roller. The new procedure involves, as a first step, so positioning the distended tube with respect to the roller that one end of the tube projects beyond one end of the roller. Heat, for shrinking the film, is then applied first at the projecting end of the film, to close that end of the film down onto the roller and in so doing to position annular sections of the film, immediately adjacent the shrunk sections, in spaced, substantially concentric relation to the roll surface. This procedure serves to center the cover concentrically with respect to the roll surface. In addition, the opposite end of the tubular cover is gripped and drawn axially to maintain the tube taut and concentric. Thus, as the heat shrinking operation is carried out progressively from one end to the other of the roll, that part of the film which is being heat-shrunk at any given time is initially spaced away from the roller surface to promote maximum uniformity in the shrinking operation. Further, by maintaining the tube taut in an axial direction, accommodation is made for the enlargement in width which accompanies lengthwise shrinkage, and air pockets and other deformities are avoided.

Other significant aspects of the invention relate to the provision of novel and improved apparatus for positioning of the film end sections, during the heat-sealing operation, and the arrangement, support and guidance of heat-sealing facilities for controlled travel along the seam. In this connection, the invention provides a simplified, practical apparatus, suitable either for use in the shop or for in situ application, which enables the end edges of the film to be properly aligned in the first instance and held in alignment during the heat-sealing operation. The apparatus further includes novel arrangements for confining the film, at least during the heat-sealing operation, between non-moving surfaces, while at the same time exposing the film edges to the influence of a moving heat source. As a specific feature of the new apparatus, a novel arrangement of carrier means is provided on opposite sides of the joined film edges for conveying a pair of heat-sealing elements in unison along the seam. A pair of heat-conductive slip sheet elements are interposed between the carriers and the film, the slip sheet elements advantageously extending from one end to the other of the seam and being non-movable throughout the entire heat-sealing operation. The carrier means are so mounted and guided as to be pressed against the slip sheets, on opposite sides of the film, so that the film is firmly pressed and effectively confined throughout the operation. The carrier means include cooling facilities generally surrounding the heat-sealing elements, so that at no time does the region of the film which is heated to the point of fusion extend beyond the area maintained under confinement between the carrier means.

For a better understanding of the above and other advantageous features of the invention, reference should be made to the following detailed specification and to the accompanying drawing, in which:

FIG. 1 is an elevational view of an apparatus according to the invention for making a heat-sealed butt seam between two end edge sections of a fluorinated ethylene polymer or similar film material;

FIG. 2 is an enlarged, cross-sectional view, taken generally along line 2—2 of FIG. 3;

FIG. 3 is an enlarged, fragmentary, cross-sectional view taken generally along line 3—3 of FIG. 2;

FIG. 4 is an enlarged, fragmentary, cross-sectional view illustrating the heat-sealable film material, and the means for confining said material, prior to the forming of the heat-seal union;

FIG. 5 is an enlarged, fragmentary, cross-sectional view illustrating the film end sections, and the confining means, substantially at the time of formation of the heat-seal union;

FIG. 6 is an end elevational view of a typical apparatus for use in internally distending a tube prior to application over a roll;

FIG. 7 is a cross-sectional view taken generally along line 7—7 of FIG. 6;

FIG. 11 is a schematic representation of an arrangement according to the invention for installing a heat-shrinkable roll covering with uniformity and concentricity.

Figure 8:
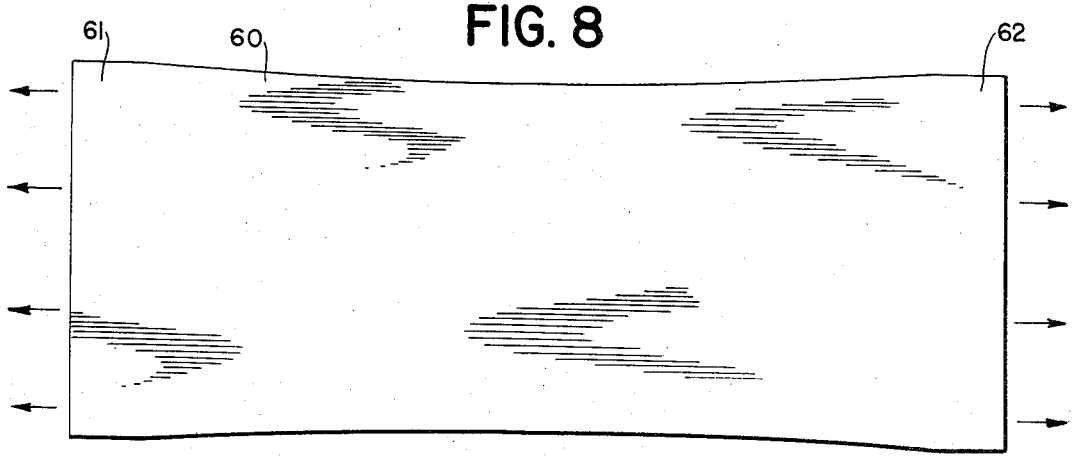
FIG. 8 is a plan view of a section of heat-sealable film distended lengthwise over most of its length, exclusive of its opposite end areas.

Referring now to the drawing, and initially to FIGS. 1–5 thereof, the reference numeral 10 designates generally a frame structure, consisting primarily of a pair of spaced guide rails 11, 12 (FIG. 3), which typically may be in the form of conventional channel beams, for example. At one end, the channels 11, 12 are supported, as by pins 13, upon a suitable stanchion or support 14. At the opposite end, the channels advantageously are supported by means of cooperating rollers 15, 16. The upper roller 15 is suitably journaled in a bracket 17 secured to the spaced guide rails 11, 12, while the lower roller 16 is journaled in a suitable floor stanchion 18. As illustrated in FIG. 1, the rollers 15, 16 are vertically aligned, so that the upper roller 15 rests directly upon the roller 16 and thereby supports one end of the guide rail assembly. Advantageously, however, the rollers 15, 16 are otherwise disconnected from each other.

In accordance with the invention and as more specifically illustrated in FIG. 3, the upper flanges 19, 20 of the respective guide rails are aligned in a common horizontal plane and define aligned supporting surfaces. Each of the supporting surfaces 19, 20 is adapted to support an end edge area 21, 22 of a film section 23, 24. According to the primary objectives of the present invention, the film sections 23, 24 will constitute opposite end sections of a single length of film to be joined into tube form, but the broader concepts of the invention encompass the possibility that the web sections may be separate and independent lengths of film, to be joined end to end.

Most advantageously, the film material contemplated for use in connection with the present invention is made available by E. I. du Pont de Nemours & Co., Inc. (Film Department), Wilmington 98, Delaware, under the trademark "Teflon" FEP. This material, which is understood to form the subject matter of the Bro and Sandt U.S. Patent No. 2,946,763 and the Schreyer U.S. Patent No. 3,085,083, is a heat-sealable fluorinated ethylene polymer which has certain characteristics of resistance to degradation by heat and superior release properties which make it desirable for use as a roll covering material, while at the same time being heat-sealable. Other fluorinated ethylene polymer materials may also be useful to advantage in certain roll covering applications, representative of these being "Kel-F," a trifluorochloroethylene manufactured by Minnesota Mining & Manufacturing Company, and "Aclar," a material similar to Kel-F, manufactured by Allied Chemical Company. Likewise, such heat-sealable fluorinated polymers as "Penton," manufactured by Hercules Powder Company, and "Kynar," manufactured by Pennsalt Chemical, may be used to good advantage. Within the broader concepts of the invention, still other heat-sealable polymers could be utilized, it being understood that the most advantageous application of the invention presently envisaged is the covering of large diameter rolls with fluorinated ethylene polymer materials, for the first time enabling the advantageous characteristics of such roll coverings to be realized in connection with rolls of the larger "non-handleable" sizes.

In accordance with a specific aspect of the invention, the end edge areas 21, 22 are so positioned on the supporting flanges 19, 20 that the end edge extremities of the respective film sections substantially abut along the vertical plane dividing the space between the guide rails 11, 12. Most advantageously, a slight clearance 25 (FIG. 4) is provided between the end extremities of the film sections. A typical clearance space may be on the order of 0.010 inch in a typical set-up for joining end sections of 20 mil film, the pertinent considerations being that the initial clearance space be approximately equal to the lengthwise thermal expansion of the film under the influence of the heat applied during heat-sealing, so that the film ends may be joined in the absence of any tendency for the material to buckle or otherwise distort under expansion forces.

To facilitate the operation of accurately aligning the respective film end sections 21, 22 into substantially butted relation along a predetermined seam axis, with appropriate clearance, it is advantageous to provide a plurality of individually and independently manipulatable clamping elements disposed from one side of the other of each film section, along the entire end edge area thereof. Of particular suitability for this purpose are a large plurality of magnetic elements 26, which advantageously are electromagnets, arranged to be placed upon the supporting flanges 19, 20. When energized, the magnets will be attracted to the flanges even through the interposed film sections 23, 24, as will be understood. The magnetic elements 26 may be positioned every six inches or every foot, for example, along the entire end edge area 21, 22 of a film section, substantially as illustrated in FIG. 1. In the aggregate, the plurality of magnetic elements serves to forcibly and reliably retain the films in preset, accurately aligned positions, while accommodating manipulation and adjustment of the film edges, in order to achieve the desired alignment in the first instance.

As illustrated particularly in FIGS. 3–5, and in accordance with one of the significant aspects of the invention, the aligned, substantially butted end edge areas 21, 22 of the film sections are confined between elongated slip sheet elements 27, 28. Advantageously, the slip sheet elements 27, 28 are foil-like sheets (e.g., 10 mils thickness) and so have little stiffness or rigidity of their own with which to confine the free end edge areas of the respective film sections. However, in conjunction with the foil-like slip sheet elements, there are provided a pair of carrier frames 29, 30, which are supported in opposed relation below and above the "sandwich" comprised of the two slip sheets 27, 28 and the intermediate film end areas 21, 22. The carrier frames 29, 30 have substantially flat pressure plates 31, 32, which face the respective slip sheet elements 27, 28, and the support and guidance of the carrier frames 29, 30 is such that the plates 31, 32 thereof are pressed toward each other and into contact with corresponding areas of the slip sheets. In this way, those portions of the film end areas which are confined between slip sheets and between carrier frames are held in flat, precisely aligned relation. And, by reason of the relative flexibility of the foil-like slip sheet elements, precise alignment of the film end areas is assured even in the event of some misalignment of the carrier frames with respect to the supporting flanges 19, 20.

Most advantageously, the slip sheet elements 27, 28 are formed of a material such as "Invar" (International Nickel Co., Inc.), which is a nickel-iron base alloy containing approximately 36 percent nickel. This material is characterized particularly by its very low thermal coefficient of expansion, so that distortions are not introduced in the slip sheet elements by reason of localized heating thereof to high temperatures during the heat-sealing operations. If desired, the bottom slip sheet element 27 may be of sufficient width to be supported by the guide rail flanges 19, 20, although this does not appear to be necessary. The upper slip sheet 28 advantageously is not of such width as to extend under the magnetic clamping elements at both sides, because it is desirable to position and clamp down the film end areas 21, 22 prior to placement of the upper slip sheet.

As reflected in FIGS. 1–5, the carrier frames 29, 30 may be substantially identical in form, typically being of boxlike construction. The lower carrier frame has a flat pressure plate 31 at the top, whereas the upper carrier frame has a flat pressure plate 32 at the bottom, so that the two pressure plates oppose each other in aligned relation, as clearly illustrated in FIGS. 2 and 3. In a practical installation for the joining of elongated (e.g., up to 15 to 30 feet) butt seams between two end sections of 20 mil Teflon FEP, for example, the pressure plates 31, 32 may have dimensions of approximately 2 to 3 inches in width and 10 to 12 inches in length. It is desirable that the pressure plates be formed of a material such as copper, which is a relatively good conductor of heat.

Within each of the carrier frames 29, 30 is an electrically actuated heating element 33, 34, and each heating element has a hot bar 35, 36 extending through an opening provided therefor in the respective pressure plate and terminating in flush relation to the active surface of the pressure plate. The hot bars 35, 36 constitute the active heat sources for effecting the fusion of the film edges and, in accordance with the invention, the hot bars are very narrow in a direction across the seam and very short in relation to the length of the seam. By way of illustrative example, the width of a hot bar element may be on the order of ¼ inch, while its length may be on the order of about 2 inches.

In order to keep the heat of the hot bars out of the pressure plates 31, 32, it is advantageous to surround the hot bars with suitable insulation, as indicated at 37, 38 in FIG. 5. Further, coils 39, 40 for the circulation of cooling water are mounted in conductive relation to the respective pressure plates 31, 32 so as to extract heat from the plates and thereby cool the slip sheets and the film edges confined therebetween. In this respect, in order to achieve an effective heat-sealed butt joint in Teflon FEP film, for example, the hot bars 35, 36 may be heated to the relatively high temperature of 650° F. Accordingly, and pursuant to the principles of the invention, the heat imparted to the film for heat-sealing purposes is confined to the smallest practicable area, in order to minimize distortion of the film through thermal expansion. To this end, the length of the hot bar elements should be kept as short as possible, consistent with achieving an adequate fusion of the film material at a reasonable speed, and investigations to this time indicate that the hot bars should not exceed more than a few inches in length and that they definitely should not be as long as 12 inches, for example, at least for use with a material having as high a fusion temperature as Teflon FEP.

As illustrated particularly in FIG. 1, and in accordance with one of the more specific aspects of the invention, the carrier frames 29, 30 are guided and supported by means of cables 41, 42 which are stretched very taut and guided about appropriate sheaves 43–46. As illustrated, the location of the sheaves, 43, 44 and 45, 46 advantageously is such as to direct the cables 41, 42 respectively slightly upward and slightly downward, so that the carrier frames 29, 30 are urged toward each other and into slight pressure relationship with the interposed slip sheets and film sections. In fact, it may be appropriate in some instances to guide both sets of cables 41, 42 over common sheaves aligned in the plane of the web material. Suitable means, such as turnbuckles 47, 48 are utilized to provide for adjustment of cable tension and also to facilitate detachment of the carrier frames from their respective cables to facilitate positioning of the film end areas and/or to enable a finished tube of material to be removed from the apparatus.

In the illustrated arrangement of FIG. 1, both sets of carrier cables 41, 42 are driven in unison by a suitable drive system, indicated schematically at 49, it being contemplated that suitable speed control means will be provided to enable the movement of the carrier frames to be precisely controlled.

In order to join two film sections 23, 24, as in the formation of a tube, the film end areas 21, 22 are aligned on the guide rail flanges 19, 20 and clamped in place by the individual magnetic elements 26. With the slip sheets 27, 28 in place, the carrier frames 29, 30 are positioned in opposed relation, adjacent one side edge of the film, and the cables 41, 42 are attached and adjusted to taut condition. When the hot bars 35, 36 are brought up to heat, the drive system 49 is actuated to advance the carrier frames 29, 30 at a predetermined speed along the seam, from one side edge of the film to the other.

In the instance of joining two end sections of a 20 mil Teflon FEP film, an initial clearance space 25 (FIG. 4) of about 0.010 inch advantageously is provided. Accordingly, as the hot bars travel along the seam, a small predetermined area of the film, on both sides of the seam, is exposed to heat through the slip sheets 27, 28, causing the film first to thermally expand substantially into contacting relation and ultimately to flow and fuse together to complete a seal. As the hot bars 35, 36, constituting a progressively moving heat source, are advanced along the seam, the film is maintained in precise alignment by the confinement of the pressure plates 31, 32 acting in conjunction with the slip sheets 27, 28. This not only assures the proper alignment of the film end edges so that the seam will be flat and true, but it also prevents any displacement of the material which has been heated to a flowable condition. In this respect, as illustrated particularly in FIG. 5, the slip sheets 27, 28, in conjunction with the pressure plates, act to completely confine any flowable material between the original surface planes of the film, as defined by the unmelted areas contacted by surrounding areas of the pressure plates.

Of particular significance, although the hot bars 35, 36 constitute moving heat sources which travel from one end to the other of the seam, the interposition of the foil-like, non-moving slip sheets 27, 28 completely isolates the melted, flowable material from the moving parts of the system, so that the seam area is not disfigured.

The amount of clearance space 25 does not appear to be particularly critical, in that it does not appear necessary that the spaced film edges actually contact prior to fusion, because of the ability of the heated material to flow to a limited extent. It does appear to be especially desirable, however, to have some clearance, so that the opposite edges of the film are not caused to press against each other under thermal expansion and cause distortion in surrounding areas of the film. On the other hand, the clearance should not be so great as to cause the film to thin down significantly in the seam area.

When the carrier frames reach the opposite side edge of the film, the seam is complete. In the case of the formation of a tube, the respective cables 41, 42 will be disconnected, and the tube may be removed from the apparatus by drawing a wall portion of the tube between the rollers 15, 16. In this connection, it may be desirable in some instances to reorient the tube so that the seam is aligned with the rollers 15, 16 before removal. If the loading of the rolls is appropriate, it may be possible thus to calendar the seam, if that appeared to be desirable.

In the preparation of a roll covering, in accordance with one of the procedures of the invention, the completed tube, after seamnig, is applied on a distending apparatus, which may be of the type illustrated in FIGS. 6 and 7. That apparatus, which may be of any appropriate length and width to accommodate the tube dimensions, consists of a pair of pressure bars or rollers 50, 51 supported by bearings 52 for rotational movement. The bearings 52 are in turn supported by brackets 53 connected by expander arms 54, 55 to the piston and cylinder elements 56, 57 of a suitable fluid actuator.

The proportions of the expander apparatus are such, in relation to the circumference of the tube 58 as initially formed, that the tube may be received relatively closely over the pressure bars 50, 51 when the fluid actuator is in a retracted condition. Thereafter, gradually increasing fluid pressure is applied to the actuator while, simultaneously, the pressure bars 50, 51 are rotated (as by a suitable crank or motor drive, not shown) until the tube is uniformly distended to the desired degree. The thus distended tube is applied endwise over the roll to be covered an then heat-shrunk into snug fitting relation to the roll surface, avantageously in a manner to be described herein.

Particularly where the nature of the roll to be covered precludes the kind of manipulations required for endwise application of a completed tube, such that the roll covering must be formed by in situ butt seaming of the covering film, it is necessary to perform the film distending operations prior to applying the film to the roll surface and forming the heat-sealed seam. In accordance with a specific aspect of the invention, this is advantageously carried out by initially cutting a length of the covering film to have predetermined length and width dimensions appropriate for the roll to be covered. Thereafter, the cut film section, designated by the reference numeral 60 in FIG. 8, is distended lengthwise over substantially its entire length, but importantly excluding the end edge areas 61, 62. Procedurally, this may be accomplished conveniently by wrapping end portions of the initial film section about appropriate pipes or bars and then applying distending force to the connecting span of film by acting on the pipes. In this manner, the extreme end areas of the film are isolated from the distending force and retain their initial, relaxed internal structure. By way of specific example, in a roll covering for a paper machine dryer drum having a circumference of, say 15 feet, the undistended end areas 61, 62 typically may constitute about 6 to 12 inches of the film length.

As will be understood, in accordance with the basic principles of the invention, in situ application of a roll covering, using a partially distended film section 60 as shown in FIG. 8, may be accomplished readily by placing the guide rails 11, 12 of the FIG. 1 apparatus, detached from their floor stanchions, directly on top of the roll to be covered. The retained distention of the film section 60 is calculated to be such that the closed film tube has sufficient circumferential length to embrace both the roll to be covered and the guide rails resting thereon, with enough retained shrinkage being provided to enable the film subsequently to be shrunk down into tight fitting relation to the roll surface, after removal of the guide rails and appurtenant heat-sealing apparatus.

The in situ joining of the film section 60 into a tubular roll covering takes place according to the procedures previously described with reference to FIGS. 1–5, it being understood that the undistended end areas 61, 62 correspond to the end edge areas 21, 22 of FIG. 3. It is necessary that these end areas remain undistended and therefore stabilized against heat-shrinkage, because otherwise the opposed end edges of the film would withdraw from each other when heated, precluding the making of a heat-sealed seam.

Heat-shrinking of the butt seamed tubes into tight fitting relation with a roll surface may be accomplished in a variety of ways, depending somewhat upon the size and nature of the roll. In the case of larger rollers, the heat-shrinking operation advantageously is carried out by moving a heat source, usually in the form of a hot air blower, circumferentially around the roll while longitudinally advancing the heater, such that all parts of the film are uniformly exposed to the heat. The stable circumference of the film is, of course, somewhat less than the circumference of the roll surface, so that the film seeks a size smaller than the roll surface and thereby draws itself into tight fitting relation with the roll surface. Advantageously, portions of the film project beyond the ends of the roller, where permissible, so that edge portions of the film are drawn tight against the ends of the covered roll, as indicated at 70 in FIG. 10, for example.

Figure 9:
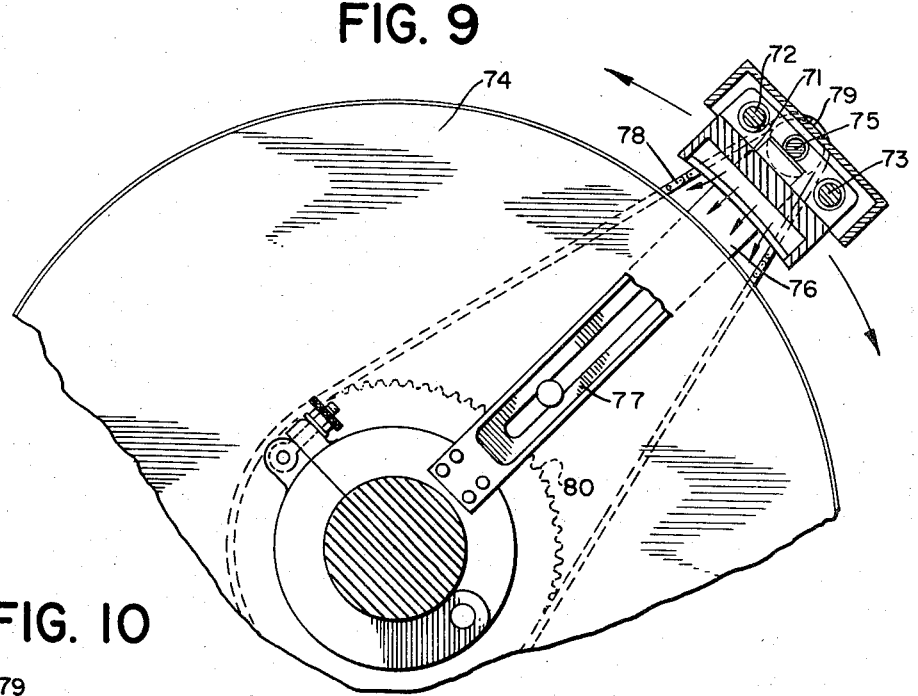
FIGS. 9 and 10 are fragmentary, cross-sectional views illustrating one typical form of apparatus useful for heat-shrinking of a distended tube into tight fitting relation with a roll to be covered.
Figure 10:
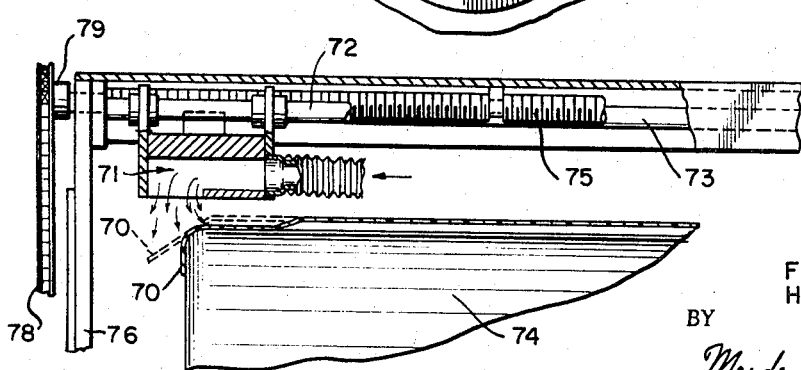

The apparatus illustrated in FIGS. 9 and 10, by way of example only, consists of a hot air heat source 71, which is mounted on a pair of guide rods 72, 73 extending from one end of the roller to the other. The heater is adapted to slide on the guide rods across the entire face of the roll, designated by the numeral 74, and is actuated to do so by means of a threaded rod 75. The guide rods 72, 73 are supported at the ends in radius arms 76, 77 journaled for rotation about the axis of the roll itself, and the threaded rod 75 may be actuated by suitable means such as a chain 78 connecting a sprocket 79 at the end of the threaded rod and another sprocket 80 fixed to the roll to be covered.

As the apparatus of FIGS. 9 and 10 is turned repeatedly about the axis of the roll 74, the heater 71 travels circumferentially about the surface of the film while being advanced longitudinally by means of the threaded rod 75.

In accordance with one specific aspect of the invention, in connection with the covering of large diameter rolls supported in horizontal disposition during the covering operation, the tubular covering is so proportioned that a flap portion 70 thereof projects beyond the roll, at least at one end. Initially, the heat to shrink the tube down onto the roll surface is applied to the free projecting end 70 of the film, causing this section of the film to shrink to a diameter less than the surface diameter of the roll. This causes the end portion of the film tube to tend to assume a somewhat conical shape, as indicated in broken lines in FIG. 10, and this in turn serves to position unshrunk portions of the film, immediately adjacent shrunk portions of the film, concentrically with respect to the roll surface. In addition, the free end of the film is engaged by means, such as a ring 85 and springs 86 shown in FIG. 11, which will exert a continuous, relatively constant axial force on the tube. This not only improves concentricity of unshrunk portions of the tube but takes up all increase in tube length which accompanies shrinkage in its circumferential dimensions. Under these circumstances, the progressive heating of unshrunk portions of the film can proceed with extraordinary uniformity not otherwise attainable. In this respect, it will be understood that, in a horizontally disposed roll, the unshrunk tube will tend to lie in contact with upper portions of the roll surface while hanging free below lower portions of the roll surface. In the absence of the procedures of the invention hereinbefore recited, this tends to result in non-uniform heating of the film with consequent distortions. In the procedure of the invention, by starting the heat-shrinking operation off the end of the roll, and by maintaining the tube under axial tension thereafter, the film is concentrically positioned relative to the roll surface when the shrinking commences at the roll end extremity, and this condition continues to prevail throughout the remainder of the operation.

The apparatus and techniques of the invention are especially advantageous in that, for the first time, very large rolls may be provided with surface coverings of Teflon FEP or similar fluorinated ethylene polymer materials in a practical and expedient manner. This result is made possible, according to the invention, by enabling the opposite ends of a wide film section to be joined in a heat-sealed butt seam. Heretofore, the formation of such seams in substantially elongated tubes has not been capable of achievement by practical procedures, if at all.

One of the significant concepts of the invention resides in the use of travelling carrier frames incorporating narrow, relatively short heat-sealing bars surrounded by flat, relatively larger area, cooled pressure plates. A pair of opposed carrier frames act upon pre-positioned film edges, through non-adherent slip sheet elements to precisely align and stabilize the film edges in the specific area where heat-sealing is taking place, as the carrier frames advance progressively along the seam. The arrangement of the invention, utilizing small area heat sources in conjunction with flat, cooled pressure plates and slip sheets which are stationary with respect to the region about the heat sources, enables a smooth, clear uniform heat-sealed butt joint to be formed without significant distortion of the film material.

One advantageous aspect of the invention is that it enables butt seamed tubular roll coverings to be formed in situ, so that it is not only possible but economically practical to install roll coverings in existing equipment, such as paper machine dryer sections, textile dryers and slashers, etc., which have rolls too large or otherwise inconvenient to remove and handle independently.

While the primary objectives of the invention relate to the making of roll coverings of Teflon FEP and other fluorinated ethylene polymers, some of the concepts disclosed may have advantageous applicability to other tasks, such as in the joining of sections end to end by elongated heat-sealed butt seams or in the joining, in tubes or otherwise, of other heat-sealable film materials. Moreover, other aspects of the invention, concerning procedures subsequent to heat-sealing, may be applicable to other heat-shrinkable roll covering materials, whether seamed or not and whether heat-sealable or not. Mylar film, oriented in the machine direction and joined in a seam otherwise than by heat-sealing techniques, represents a contemplated example of the last-mentioned class of materials. Accordingly, reference should be made to the following appended claims in determining the full scope of the invention.

We claim:
1. The method of joining two web sections of film material heat-sealable at temperatures significantly above ambient, which comprises:
 (a) positioning and securing opposed edges of the respective web sections so that their end edges may be brought into aligned, substantially butted relation,
 (b) predetermined end edge regions of the web sections, including the edge extremities thereof, being substantially unconfined,
 (c) bringing complementary opposed pressure to bear in zones on opposite sides of the unsupported film end edge regions to effect substantial alignment of limited areas of the edge extremities of the film ends,
 (d) applying heat to the aligned, substantially butted film ends in a heating zone lying within the effective areas of the applied pressure and of limited size with respect thereto,
 (e) advancing the pressure and heating zones along the seam progressively to bring the film ends into precise alignment and effect a heat-sealed union thereof, and
 (f) during said advancing step, maintaining the progressively moving heated areas of the film non-movably confined between planes defined by surfaces of the film outside the moving zone of heat.
2. The method of claim 1, further characterized by:
 (a) said film being non-movably confined by a slip sheet material comprising a web of material having a substantially higher melting point than said film material and which is non-bondable to the film material at its fusion temperatures.
3. The method of claim 1, further characterized by:
 (a) said web section comprising opposite end edges of a single length of material.
4. The method of claim 1, further characterized by:
 (a) the substantially butted edges being exposed simultaneously to opposed synchronously moving zones of heat,
 (b) said zones of heat being of similar dimensions and being positioned on opposite sides of the web sections.
5. The method of claim 4, further characterized by:
 (a) extracting heat from said web sections, in regions immediately surrounding said zones of heat.
6. The method of covering a large roller or the like with a fluorinated ethylene polymer film material, which comprises:
 (a) forming a butt-sealed tube of the film material by following the steps of claim 3,
 (b) distending the tube from its initial diameter by internally applied force to increase its diameter within the elastic limits of the material,
 (c) applying the tube endwise over said roller, and
 (d) exposing the tube to sufficient heat to shrink the film material and reduce the diameter of said tube toward its initial diameter and into snug contact with said roller.
7. The method of claim 6, further characterized by said distending step comprising:
 (a) applying internal distending force to said tube along opposed areas of limited circumferential extent relative to the entire circumferential dimension of the tube, and

(b) advancing the tube circumferentially during the distending step, whereby the areas of force application progress about the entire wall of the tube.

8. The method of covering a large roller or the like with a fluorinated ethylene polymer film material, which comprises:
    (a) semi-permanently elongating a length of the film material over its length, excluding predetermined end edge areas at each end,
    (b) thereafter forming a butt-sealed tube of predetermined initial diameter by following the steps of claim 3, and
    (c) while said tube is positioned on said roller, exposing the tube to sufficient heat to shrink the film material and reduce the diameter of said tube toward its initial diameter and into snug contact with said roller.

9. The method of claim 8, further characterized by:
    (a) said film material being initially formed into a tube while in position encircled about said roller.

10. The method of claim 8, further characterized by said film being semi-permanently elongated by:
    (a) wrapping opposite end edge areas of said film about elongated rod-like elements, and
    (b) applying separating forces to the respective rod-like elements to distend the film lengthwise between said elements while maintaining the end edge areas substantially at their initial dimensions.

References Cited

UNITED STATES PATENTS

| | | | |
|---|---|---|---|
| 2,307,817 | 1/1943 | Austin | 264—95 |
| 2,360,950 | 10/1944 | Kilgour | 264—248 |
| 2,834,395 | 5/1958 | Russel et al. | 156—583 |
| 3,050,786 | 8/1962 | St. John et al. | |
| 3,098,285 | 7/1963 | Kelzenberg et al. | 29—148 |
| 3,196,194 | 7/1965 | Ely et al. | 264—127 |
| 3,225,129 | 12/1965 | Taylor et al. | 264—230 |
| 3,277,525 | 10/1966 | Buschman et al. | 264—290 |

FOREIGN PATENTS

| | | |
|---|---|---|
| 1,238,919 | 7/1960 | France. |

ROBERT F. WHITE, *Primary Examiner.*

A. R. NOE, *Assistant Examiner.*

U.S. Cl. X.R.

29—148.4; 156—86, 292; 264—248, 291